United States Patent
DeCapua et al.

(10) Patent No.: US 6,422,261 B1
(45) Date of Patent: Jul. 23, 2002

(54) WELDABLE MOUNT FOR FUEL SYSTEM COMPONENT

(75) Inventors: Dennis DeCapua, Greenfield, IN (US); Jeffrey Devall, Pontypool Gwent (GB); Gregory Brown, Connersville, IN (US)

(73) Assignee: Stant Manufacturing Inc., Connersville, IN (US)

( * ) Notice: Subject to any disclaimer, the term of this patent is extended or adjusted under 35 U.S.C. 154(b) by 0 days.

(21) Appl. No.: 09/777,731

(22) Filed: Feb. 5, 2001

Related U.S. Application Data
(60) Provisional application No. 60/180,056, filed on Feb. 3, 2000.

(51) Int. Cl.⁷ .................................................. F16K 24/04
(52) U.S. Cl. ........................... 137/202; 137/43; 137/587
(58) Field of Search ...................... 137/43, 202, 587

(56) References Cited

U.S. PATENT DOCUMENTS

| | | | |
|---|---|---|---|
| 3,021,029 A | 2/1962 | McKinlay | 220/44 |
| 3,385,468 A | 5/1968 | Fleming et al. | 220/44 |
| 4,219,126 A | 8/1980 | Oana | 220/89 A |
| 4,351,350 A | 9/1982 | Crute | 137/39 |
| 4,352,364 A | 10/1982 | Orsino et al. | 137/43 |
| 4,413,804 A | 11/1983 | Lanius et al. | 251/144 |
| 4,646,772 A | 3/1987 | Bergsma | 137/39 |
| 4,655,238 A | 4/1987 | Szlaga | 137/43 |
| 4,660,714 A | 4/1987 | Suzuki et al. | 206/0.6 |
| 4,694,870 A | 9/1987 | Vize | 141/326 |
| 4,702,268 A | 10/1987 | Ambruster et al. | 137/202 |
| 4,715,403 A | 12/1987 | Szlaga | 137/493.2 |
| 4,721,283 A | 1/1988 | Wilson | 251/63.4 |
| 4,730,652 A | 3/1988 | Bartholomew | 141/302 |
| 4,742,844 A | 5/1988 | Szlaga | 137/493.2 |
| 4,753,262 A | 6/1988 | Bergsma | 137/39 |
| 4,779,637 A | 10/1988 | Ubaldi | 137/43 |
| 4,960,153 A | 10/1990 | Bergsma | 137/587 |
| 4,966,189 A | 10/1990 | Harris | 137/587 |
| 5,028,244 A | 7/1991 | Szlaga | 55/170 |
| 5,069,423 A | 12/1991 | Amorese et al. | 251/144 |
| 5,083,583 A | 1/1992 | Benjey | 137/587 |
| 5,139,043 A | 8/1992 | Hyde et al. | 137/43 |
| 5,253,668 A | 10/1993 | Mills | 137/12 |
| 5,318,069 A | 6/1994 | Harris | 137/588 |
| 5,404,907 A | 4/1995 | Benjey et al. | 137/587 |
| 5,443,098 A | 8/1995 | Kertesz | 138/109 |
| 5,640,993 A | 6/1997 | Kasugai et al. | 137/587 |
| 5,680,848 A | 10/1997 | Katoh et al. | 123/518 |
| 5,775,357 A | 7/1998 | Regna et al. | 137/43 |
| 5,775,362 A | * 7/1998 | Sato et al. | 137/202 |
| 5,782,262 A | 7/1998 | Kim | 137/202 |
| 5,954,091 A | 9/1999 | Leadford | 137/587 |
| 5,960,817 A | * 10/1999 | Johansen et al. | 137/202 |
| 6,035,883 A | 3/2000 | Benjey | 137/202 |
| 6,085,771 A | 7/2000 | Benjey et al. | 137/15.26 |
| 6,189,567 B1 | 2/2001 | Foltz | 137/587 |

FOREIGN PATENT DOCUMENTS

| | | |
|---|---|---|
| CA | 5087377 | 11/1992 |
| EP | 597314 | 10/1993 |
| WO | WO 99/27284 | 6/1999 |

\* cited by examiner

Primary Examiner—Gerald A. Michalsky
(74) Attorney, Agent, or Firm—Barnes & Thornburg

(57) ABSTRACT

A fuel system apparatus for installation on a fuel tank. The apparatus includes a first portion extending at least partially interiorly of the fuel tank and the apparatus is installed on the fuel tank. A second portion is positioned at least partially extending into the fuel tank when the apparatus is installed on the fuel tank. A mount is provided which is at least partially retained between the first portion and the second portion. The mount at least partially extends from between the first portion and the second portion. The mount in size and dimension or at least substantially corresponding to an opening in the fuel tank to which the apparatus is attached. The mount is attachable to the fuel tank and prevents permeation of hydrocarbon vapor therethrough.

20 Claims, 6 Drawing Sheets

WELDABLE MOUNT FOR FUEL SYSTEM COMPONENT

CROSS-REFERENCE

This application claims priority under 35 U.S.C. 119(e) to U.S. Provisional Application Ser. No. 60/180,056 filed Feb. 3, 2000 which is expressly incorporated herein by reference.

BACKGROUND AND SUMMARY OF THE INVENTION

The present invention relates to a weldable mount, and in particular, to a mount adapted to be welded to a base made of a plastics material such as polymeric material. More particularly, the present invention relates to a fuel system component, such as fuel tank vent apparatus, adapted to be mounted on a vehicle fuel tank made of a plastics material using a weldable mount.

Mounting assemblies are used to mount a fuel system component, such as a venting valve assembly, in a top wall of a fuel tank. See, for example, U.S. Pat. No. 4,966,189 to Harris and PCT International Publication No. WO 99/27284 to Foltz, each of which is incorporated herein by reference. Further, U.S. Pat. No. 5,404,907 to Benjey et al. and U.S. Pat. No. 5,139,043 to Hyde both relate to weldable vapor vent valve systems and are also incorporated by reference herein.

One of the problems encountered in a fuel system is that the material used to form some of the components may be incompatible for welding to a fuel tank. Generally, fuel tanks are formed of a high-density polyethylene (HDPE) and may be constructed with a permeation or penetration barrier to prevent hydrocarbons from the fuel from escaping to the atmosphere through the tank material. The incompatibility of the materials may result in escape of hydrocarbons from the fuel tank. It would be preferable to provide a connection of the component to the tank which prevents escape of hydrocarbons from the fuel through the tank material.

Features of the present invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 9 is an exploded, enlarged sectional view similar to those as shown in FIGS. 2, 4, 6 and 8 in which a fuel system component is positioned for mounting to a fuel tank, and in which FIG. 9 shows a first portion and a second portion of the fuel component positioned for retaining a seal there between and in which said mount is positioned with a portion thereof to be retained between the first portion and the second portion and the mount having a foot extending from between the first portion and the second portion;

DETAILED DESCRIPTION OF THE DRAWINGS

Figure 1:
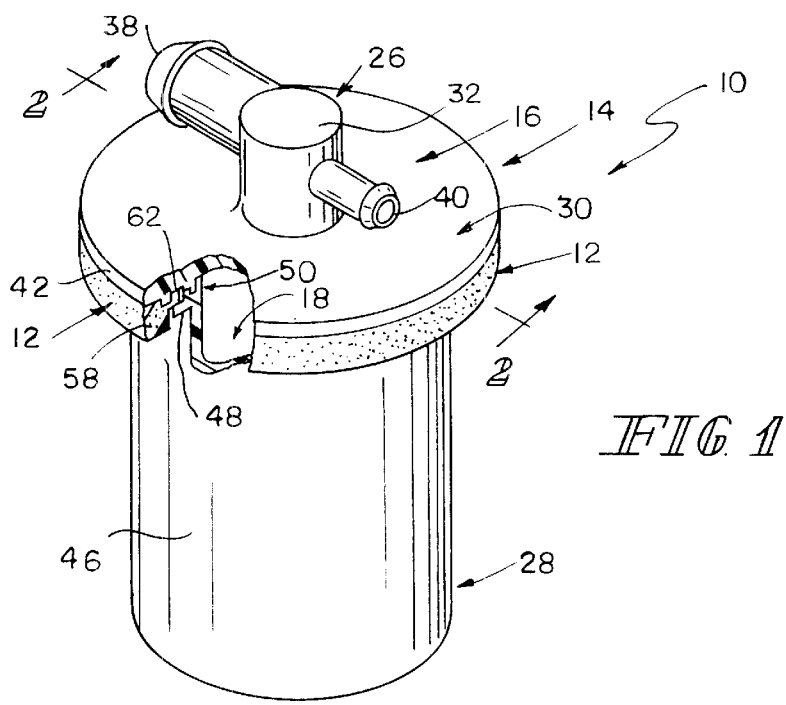
FIG. 1 is a perspective view of a fuel tank vent apparatus including a ring-shaped weldable mount, of a material which is compatible for welding to a fuel tank, carried on a housing made of a generally non-weldable material.
Figure 2:
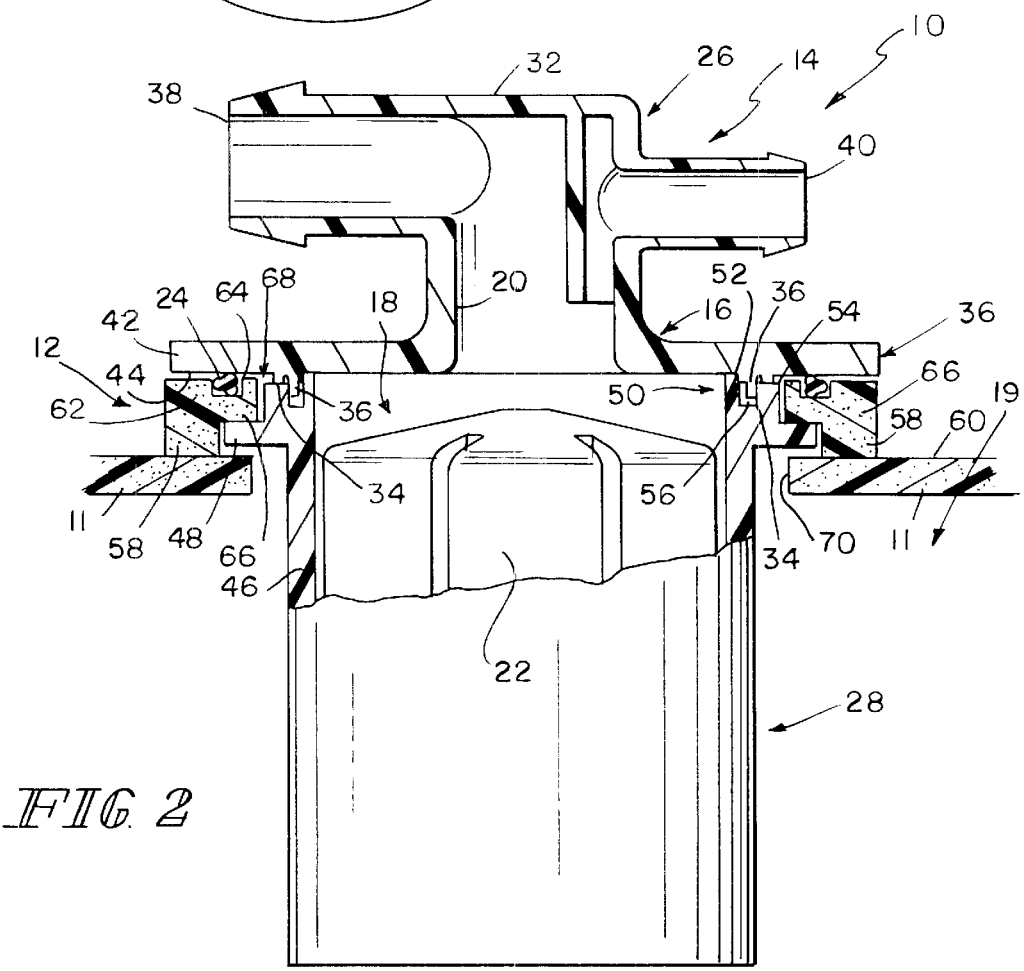
FIG. 2 is an enlarged sectional view taken along line 2—2 of FIG. 1 showing the ring-shaped weldable mount welded to a fuel tank made of a weldable plastics material so that the fuel system component is mounted on the fuel tank and the valve housing is positioned to lie in a mounting aperture formed in a top wall of the fuel tank and also showing other elements in the fuel system component including a float valve positioned to move up and down in an interior chamber formed in the valve housing and an annular seal positioned to lie in an annular channel formed in a upper portion of the ring-shaped weldable mount so that the annular seal is arranged to engage an underside of an annular valve housing flange included in the valve housing.

An apparatus 10 is shown in FIG. 1 and is configured to be mounted on a fuel tank 11 as shown in FIG. 2. Apparatus 10 is formed to include a weldable mount 12 and a fuel system component 14 coupled to weldable mount 12. In the illustrated embodiment, the fuel system component 14 is a valve assembly for controlling the discharge of fuel and fuel vapor from fuel tank 11. It is also envisioned that the present invention will also be used with a fuel system component for controlling the entry of fuel and fuel vapor to a fuel tank. It is within the scope of this disclosure to use weldable mount 12 to support other fuel system components (not shown) such as a fuel sender unit or other type of valve in a fuel tank or other tank.

Valve assembly 14 includes a valve housing 16 formed to include a vent chamber 18 communicating with an interior region 19 in fuel tank 11 and a vent passageway 20 communicating with the vent chamber 18. Valve housing 16 is made of any suitable structural, engineering-grade plastics material such as acetyl.

Valve assembly 14 further includes a valve 22 positioned to move in vent chamber 18 to open and close vent passageway 20 and an annular seal 22 arranged to establish a liquid-fuel and fuel-vapor seal between valve housing 16 and weldable mount 12 as shown, for example, in FIG. 2. Although valve 22 is a conventional float valve made of a buoyant material, any suitable closure valve could be used in vent chamber 18. In the illustrated embodiment, float valve 22 is biased in an upward direction by a coiled compression spring (not shown) that is coupled to float valve 22 and arranged to act against a portion of valve housing 16 so that float valve 22 can move upwardly to close vent passageway 20 when float valve 22 is exposed to a rising level of liquid fuel (not shown) inside interior region 19 of fuel tank 11.

Fuel tank 11 is made of a suitable plastics material such as high-density polyethylene (HDPE). Because valve housing 16 is made of acetyl, it is not weldable directly to fuel tank 11 since acetyl material cannot be welded to HDPE material. Weldable mount 12 is provided to mount a fuel system component such as valve assembly 14 on fuel tank 11. Weldable mount 12 is made of HDPE and can therefore be welded to the HDPE fuel tank 11. Each of U.S. Pat. No. 5,404,907 to Benjey et al. and U.S. Pat. No. 5,130,043 to Hyde and International (PCT) Publication No. WO99/27284, published Jun. 3, 1999 to Foltz is hereby incorporated by reference herein.

By using mount 12, the present invention overcomes permeation problems as the result of the incompatibility of the tank and component materials. The mount 12 formed of HDPE generally maintains continuity in tank material in the area of the tank where the component is attached to the tank. Maintaining such continuity helps to further reduce and prevent escape of hydrocarbons from the fuel tank.

Valve housing 16 is formed to include separate first or upper and second or lower housing portions 26, 28 as shown in FIGS. 1 and 2. Second housing portion 28 is coupled to first housing portion 26 using any suitable means to trap weldable mount 12 and annular seal 24 there between so that a suitable liquid-fuel and fuel-vapor seal will be established between apparatus 10 and fuel tank 11 once weldable mount 12 is welded to fuel tank 11 as shown, for example, in FIG. 2.

First housing portion 26 includes a circular top wall 30, a venting outlet 32 coupled to and positioned to lie above top wall 30, and first engaging portion 34 and second engaging portion 36 in the form of a pair of annular connector ridges 34, 36 (or other suitable structure) coupled to and positioned to lie below top wall 30 as shown best in FIG. 2. Venting outlet 32 is formed to include vent passageway 20 and first and second discharge ports 38, 40 communicating with vent passageway 20. Circular top wall 30 includes an annular valve housing flange 42 extending radially outwardly from annular connector ridges 34, 36 and providing a downwardly facing flat surface 44 as shown best in FIG. 2.

Second housing portion 28 includes a cylindrical sleeve 46 formed to include vent chamber 18 therein and an annular mount flange 48 extending radially outwardly from an upper end 50 of cylindrical sleeve 46 as shown best in FIG. 2. Upper end 50 of cylindrical sleeve 46 is formed to include a high, thin annular inner rim 52, a lower, thicker, annular outer rim 54 and an annular channel 56 located between rims 52 and 54 as shown in FIG. 2. Outer connector ridge 34 is configured to seat on an upwardly facing surface of outer rim 54 and inner connector ridge 36 is configured to extend into annular channel 56 when first housing portion 26 is coupled to second housing portion 28. Ultrasonic welding, spin welding, or any other suitable technique can be used to bond acetyl first and second housing portions 26, 28 to one another to establish valve housing 16 and trap annular seal 24 and a portion of weldable mount 12 between annular valve housing flange 42 and annular mount flange 48.

Weldable mount 12 is formed to include a foot 58 adapted to mate with and be welded to an outer surface 60 of fuel tank 11 and a body 62 formed to include an annular channel 64 having an opening facing toward an underside of annular valve housing flange 42 and receiving annular seal 24 therein. An engaging portion 66 in the form of a radially inner portion 66 of body 62 is configured to extend into a side-opening annular channel 68 defined by flanges 42, 48 of first and second portions 26, 28 and outer rim 54 as shown best in FIG. 2.

Apparatus 10 is assembled and installed in the following manner. Upper housing portion 26 is inverted and mounted in a fixture (not shown). Annular seal 24 is placed in circular channel 64 and weldable mount 12 is placed on annular valve housing flange 42 so that annular seal 24 engages surface 44 on flange 42. Lower housing portion 28 is then bonded to upper housing portion 26 to trap body 62 of weldable mount 12 and annular seal 24 between flanges 42 and 48 of valve housing 16. Apparatus 10 is then turned "right side up" and inserted into a mounting aperture 70 formed in fuel tank 11 as shown, for example, in FIG. 2 and foot 58 of weldable mount 12 is welded or otherwise bonded to outer surface 60 of fuel tank 11 using any suitable technique. It should be noted that the inverted orientation of the first housing is not mandatory for the proper construction and function of the invention. Rather, the inverted orientation is the preferred embodiment for assembly of the apparatus.

Figure 3:
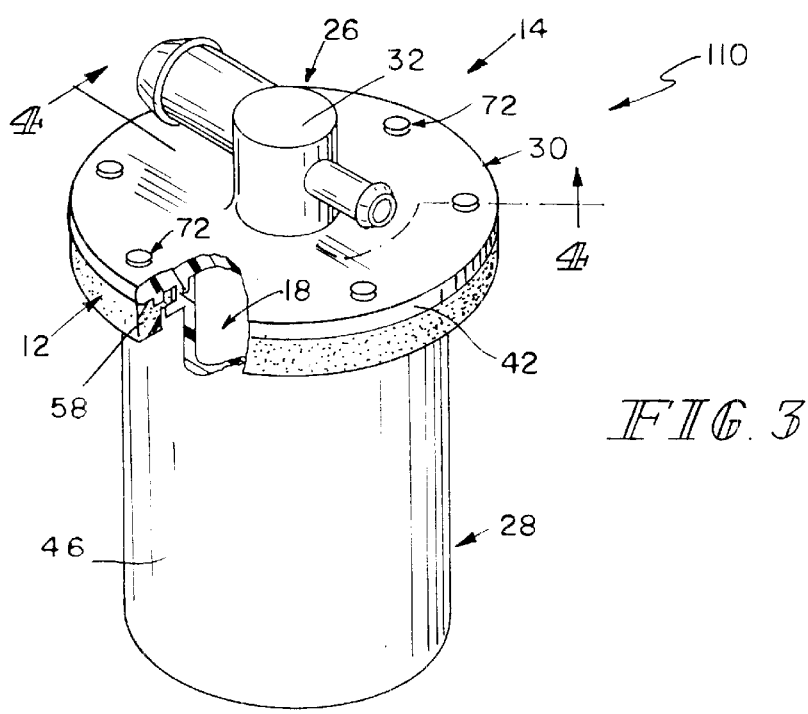
FIG. 3 is a perspective view of another fuel system component that is similar to the apparatus shown in FIG. 1 except that several generally vertical retention posts are appended to the upper portion of the ring-shaped weldable mount and configured to couple the weldable mount to the annular valve housing flange overlying the weldable mount.
Figure 4:
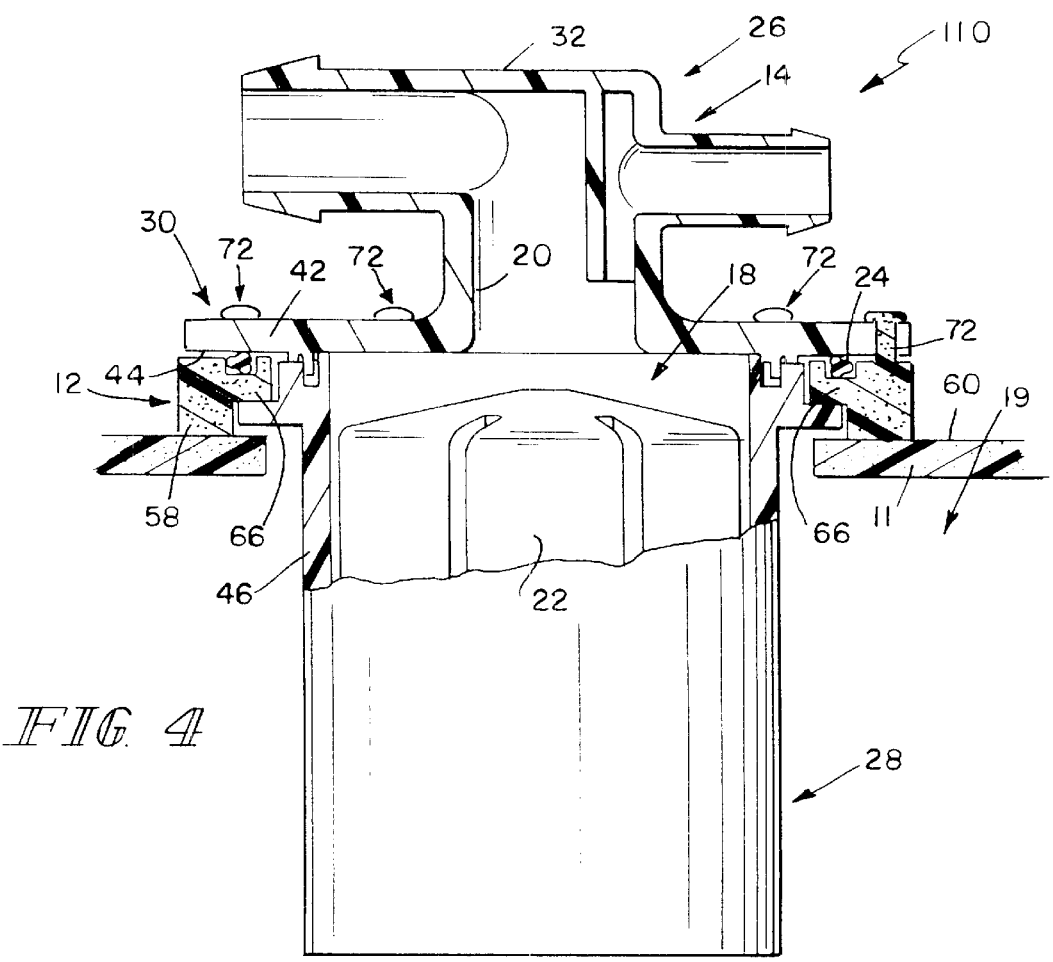
FIG. 4 is An enlarged sectional view taken alone line 4—4 of FIG. 3 showing a section through one of the retention posts provided to couple the ring-shaped weldable mount to an underside of the annular valve housing flange.

A first modification to apparatus 10 includes the addition of protrusions in the form of retention posts 72 to weldable mount 12 to produce apparatus 110 as shown in FIGS. 3 and 4. The base of each retention post 72 is coupled to an upper portion of weldable mount 12 and a middle portion of each retention post 72 is passed through an aperture formed in a peripheral portion of annular valve housing flange 42. A tip of each retention post 72 is heat-staked or otherwise formed to fix retention post 72 to flange 42 as shown, for example, in FIGS. 3 and 4. In this modification, inversion of upper housing portion 26 is unnecessary during assembly of apparatus 110 since weldable mount 12 can be coupled to flange 42 to trap annular seal 24 in place there between using retention posts 72. Preferably, retention posts 72 are formed of HDPE material to be integral with weldable mount 12.

Figure 5:
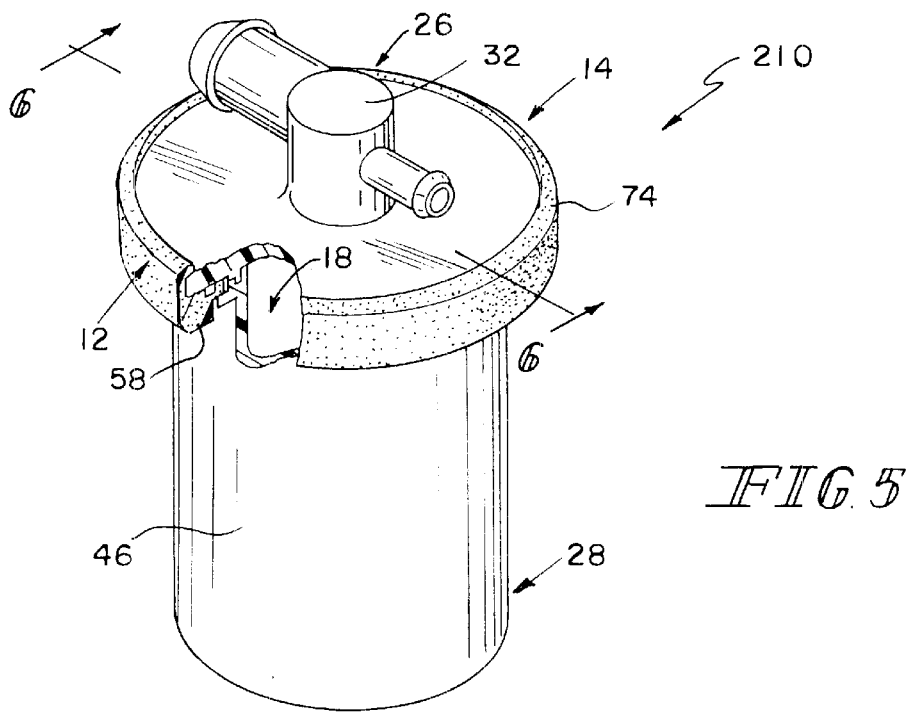
FIG. 5 is a perspective view of yet another system component that is similar to the apparatus shown in FIGS. 1 and 3 except that an annular retention rim is appended to the upper portion of the ring-shaped weldable mount and configured to couple the weldable mount to the annular valve housing flange.
Figure 6:
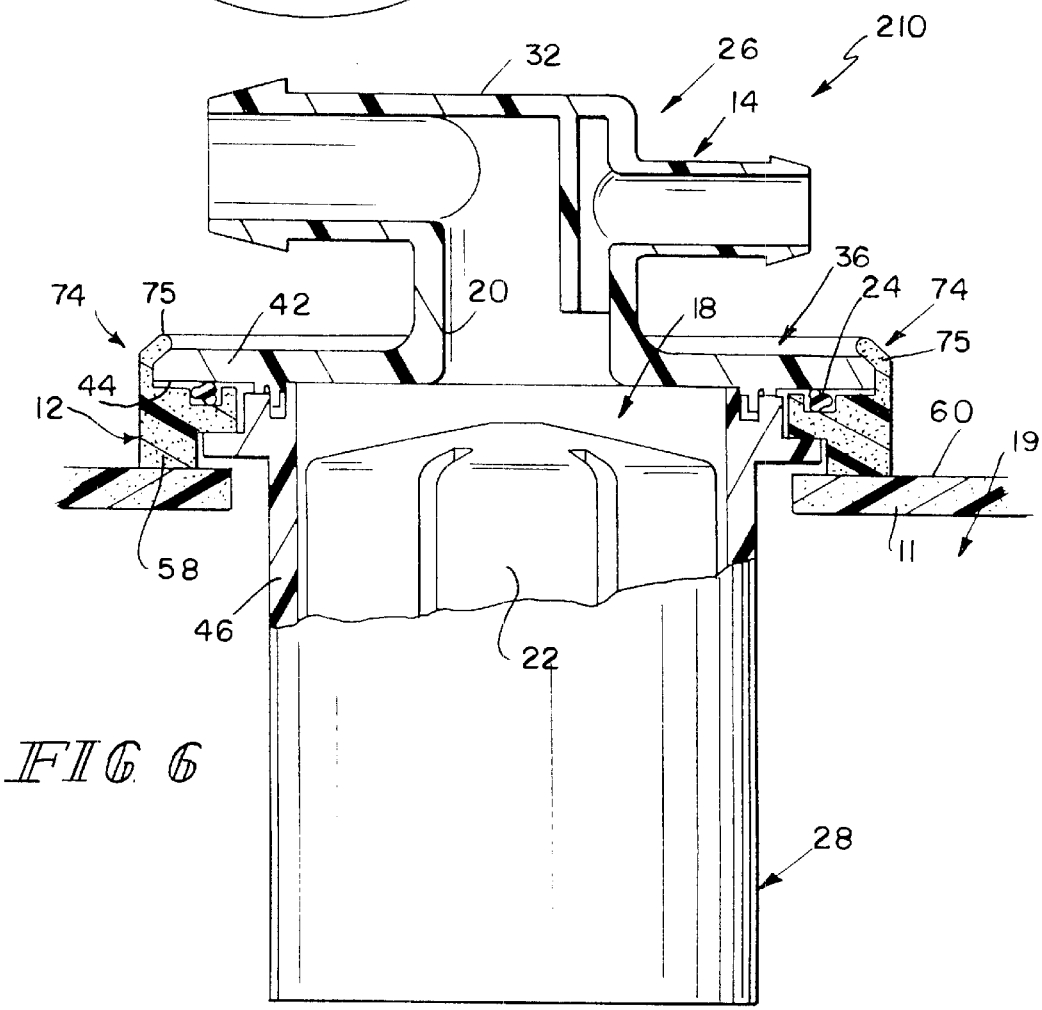
FIG. 6 is an enlarged sectional view taken along line 6—6 of FIG. 5 showing use of portions of the retention rim to couple the ring-shaped weldable mount to an underside of the annular valve housing flange.

A second modification to apparatus 10 includes the addition of a retainer 74 in the form of an annular retention rim 75 to weldable mount 12 to produce apparatus 210 as shown in FIGS. 5 and 6. The base of retention rim 75 is coupled to an upper portion of weldable mount 12 along the radially outermost edge thereof. The free end of retention rim 75 is heat-staked, deformed, or coined radially inwardly as shown, for example, in FIG. 6 to couple weldable mount 12 to annular valve housing flange 42 of valve housing 16. In this modification, inversion of first housing portion 26 is unnecessary during assembly of apparatus 210 since weldable mount 12 can be coupled to flange 42 to trap annular seal 24 in place there between using retention post 72. Preferably, retention rim 75 is formed of HDPE material to be integral with weldable mount 12. It is within the scope of this disclosure to form rim 75 as a continuous 360° strip of material or as a single rim segment or a series of two or more spaced-apart rim segments.

Figure 7:
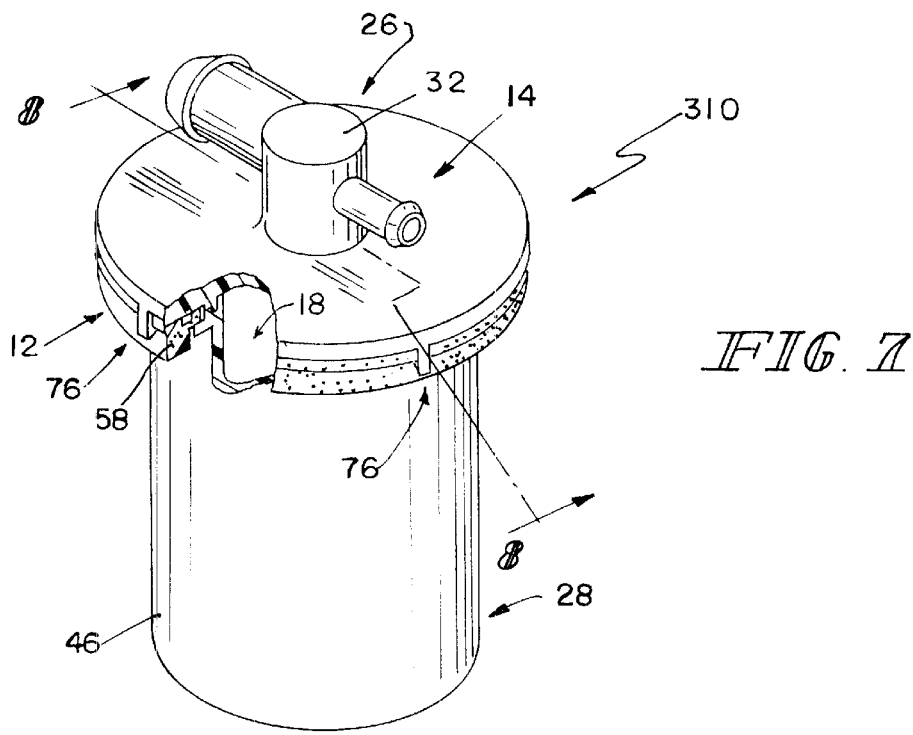
FIG. 7 is a perspective view of still another fuel tank vent apparatus that is similar to the apparatus shown in FIGS. 1, 3, and 5 except that several spaced-apart retainers are appended to the upper portion of the ring-shaped weldable mount and configured to couple the weldable mount to the annular valve housing flange.
Figure 8:
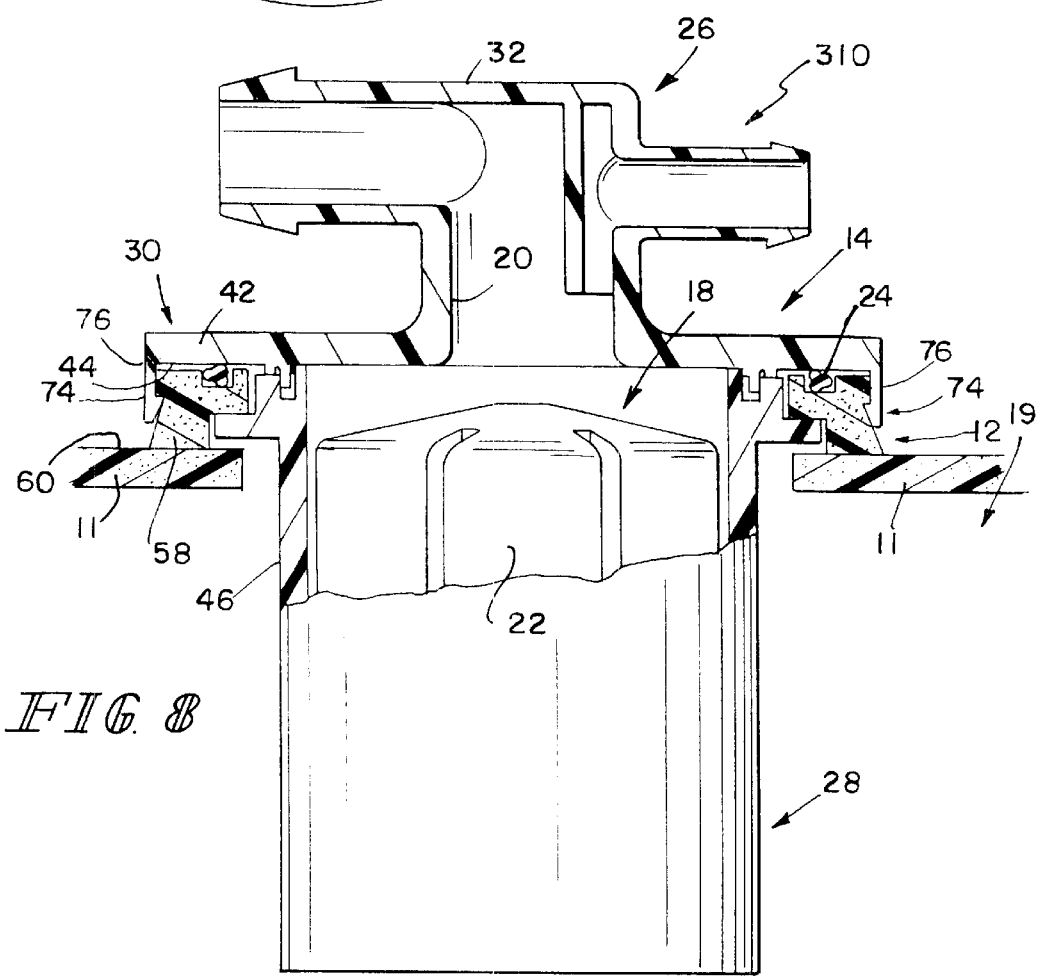
FIG. 8 is a sectional view taken along line 8—8 of FIG. 7 showing use of two of the retainers to couple the ring-shaped weldable mount to an underside of the annular valve housing flange.

A third modification to apparatus 10 includes the addition of a retainer 74 in the form of snap connectors 76 to annular valve housing flange 42 and formation of weldable mount 12 to engage snap connectors 76 to retain weldable mount 12 in a fixed position relative to valve housing 16 to produce apparatus 310 as shown in FIGS. 7 and 8. The base of each snap connector 76 is coupled to a radially outer edge of annular valve housing flange 42. A depending hook portion of each snap connector 76 is arranged and configured to extend over a corresponding portion of mount 12. As shown, the hook snaps into or otherwise engages a recess or connector receiver formed in weldable mount 12 as shown in FIGS. 7 and 8. In this modification, inversion of upper housing portion 26 is unnecessary during assembly of apparatus 310 since weldable mount 12 can be coupled to flange 42 to trap annular seal 24 in place there between using snap connectors 76. Preferably, snap connectors 76 are formed of acetyl material to be integral with upper housing portion 26.

Figure 9:
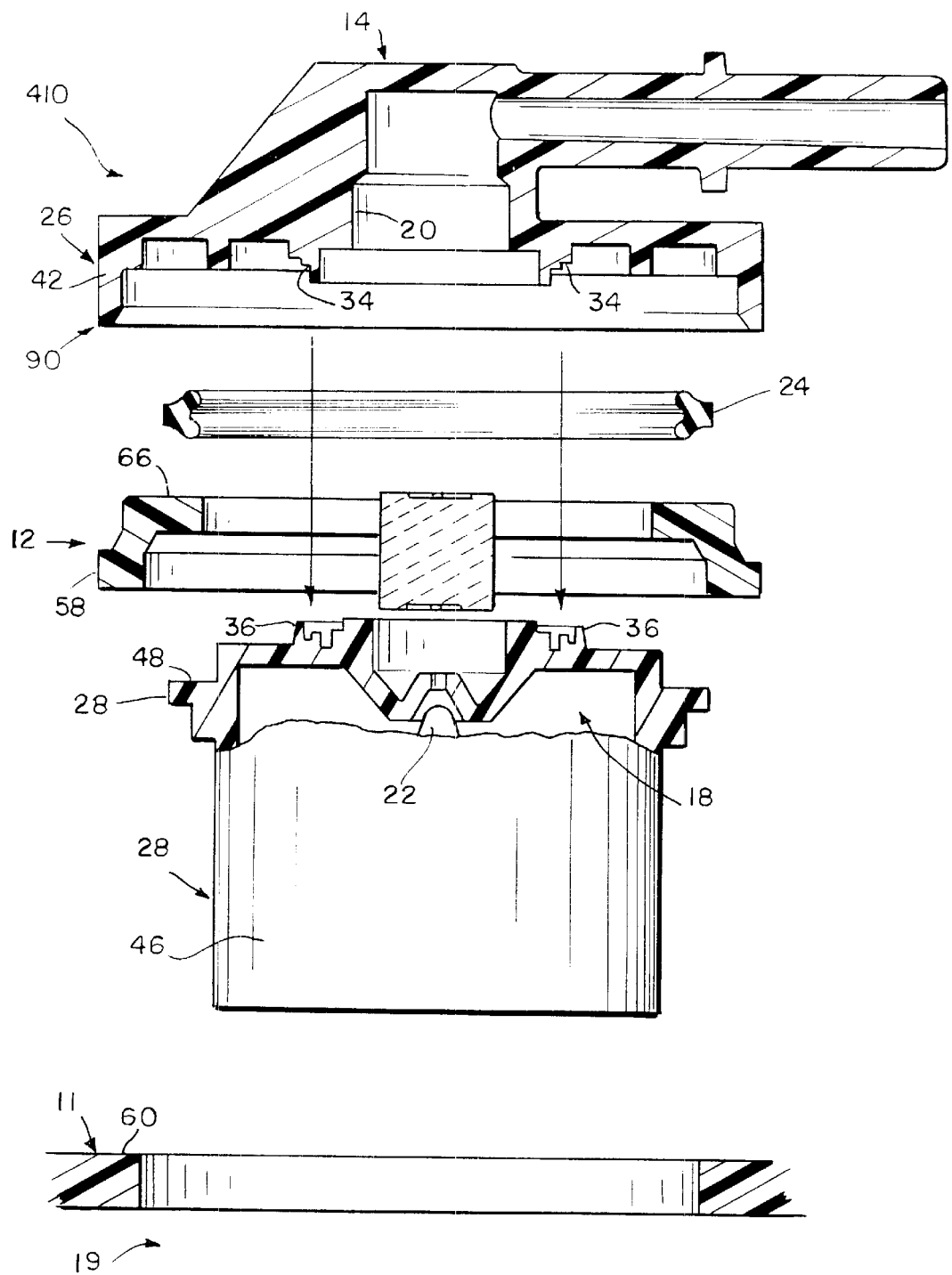
Figure 10:
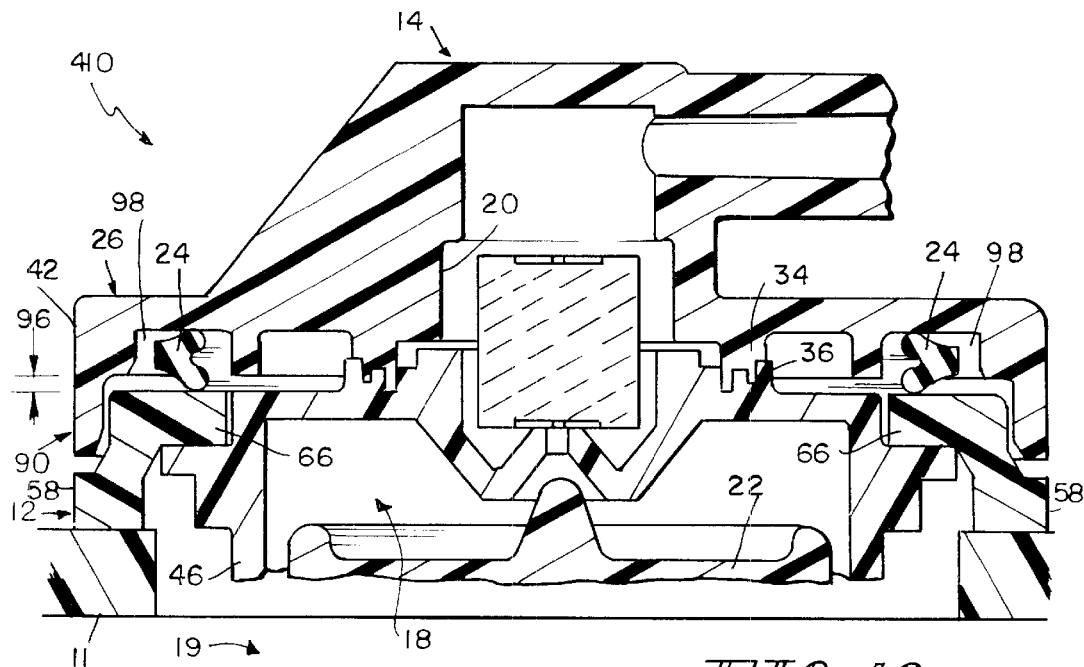
FIG. 10 is an assembled sectional view of the assembly as shown in FIG. 9 in which the assembly has been positioned for installation on the fuel tank.
Figure 11:
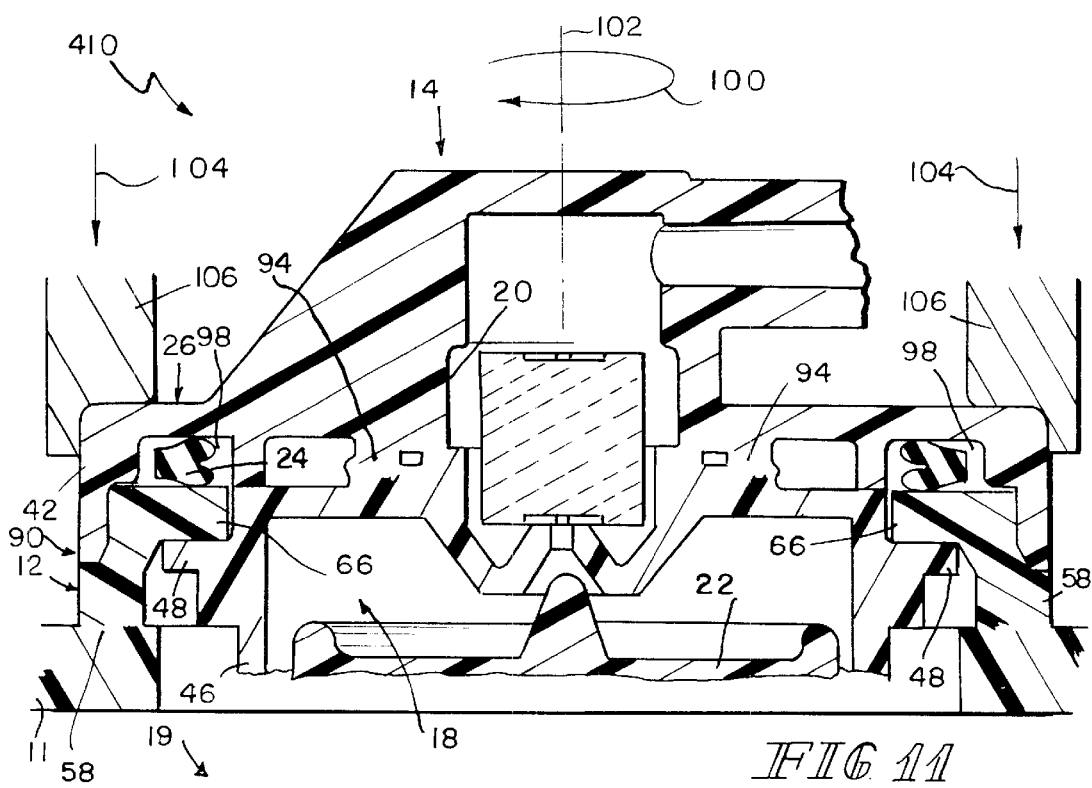
FIG. 11 is a sectional view similar to that as shown in FIG. 10 and in which the assembly is rotated about a central axis and a force is applied to the apparatus causing the foot of the mount to weld to the fuel tank.

A fourth modification to apparatus 10 includes the structures as shown in FIGS. 9–11, the first portion 26 is positioned for engagement with the second portion 28. As shown in FIGS. 9–11, mount 12 is retained between first portion 26 and second portion 28 and also includes seal 24 retained there between. The general function of the various structures is generally consistent with that as described herein above.

Mount 12 as shown in FIGS. 9–11 is formed with engaging portion 66 and foot 58. As shown in the corresponding figures, engaging portion 66 is retained between first portion 26 and second portion 28 with foot 58 extending therefrom. A flange 90 extends from first portion 28 to overlie a portion of mount 12 to increase engagement with mount 12.

First and second portions 26, 28 are provided with first and second engaging portions 34, 36. These engaging portions are formed of compatible material to allow first housing portion 26 and second housing portion 28 to be welded together. As previously noted, mount 12 is formed of a material that is compatible for welding to surface 60 of the tank 11. While first and second portions 26, 28 of the valve assembly 14 may be incompatible for welding to tank 11, the material for these portions is selected to be compatible for welding to one another.

As shown in FIGS. 10 and 11, apparatus 410 is assembled by welding first portion 26 to second portion 28. Welding the portions 26, 28 together causes the engaging portions 34, 36 (FIG. 10) to be combined as a single engaging portion 94 essentially welded as a uniform piece of material. Engaging portion 94 holds the first portion and second portion together. As the portions 26, 28 are brought together (the dimensional difference 96 in FIG. 10) mount 12 is clamped between first portion and second portion 26, 28. Also, seal 24 is compressed there between trapping seal 24 in a corresponding channel 98 providing increased sealing between first portion 26 and second portion 28.

Apparatus 410 is attached to the fuel tank 11 by means of welding as shown in FIG. 11. Generally, spin welding is one technique which may be used, as illustrated in FIG. 11. In the spin welding operation as shown in FIG. 11 apparatus 410 is rotated (100) about central axis 102 and a downward clamping force 104 is applied by a clamp structure 106 to apparatus 410. Rotation (100) of apparatus 410 in combination with pressure 104 causes foot 58 to form a bond or become welded to tank 11. Alternatively other bonding or welding techniques may be used to attach foot 58 to tank 11. For example hot plate welding or adhesive technology may be used to bond apparatus 410 to tank 11.

Although the invention has been described in detail with reference to preferred embodiments, variations and modifications exist within the scope and spirit of the invention as described and defined in the following claims.

What is claimed is:

1. A fuel system apparatus for installation on a fuel tank, said apparatus comprising:
    a first portion extending at least partially exteriorly of said fuel tank when said apparatus is installed on said fuel tank;
    a first annular flange carried on said first portion;
    a second portion being positioned at least partially extending into said fuel tank when said apparatus is installed on said fuel tank;
    a second annular flange carried on said second portion;
    a mount at least partially retained between said first annular flange on said first portion and said second annular flange on second portion;
    said mount at least partially extending from between said first and second annular flanges;
    said mount being sized and dimensioned for at least substantially corresponding to an opening in said fuel tank to which said apparatus is to be attached; and
    said mount being attachable to said fuel tank.

2. The apparatus of claim 1, wherein the mount is formed of a material compatible for welding to said tank.

3. The apparatus of claim 1, wherein said first portion is attached to said second portion.

4. The apparatus of claim 1, further comprising a seal positioned between said first portion and said second portion for sealing said apparatus.

5. The apparatus of claim 1, further comprising an engaging portion on said mount generally positioned between said first and second portions and a foot attached to said engaging portion and extending from said apparatus for attachment to said fuel tank.

6. A fuel system apparatus for installation on a fuel tank, said apparatus comprising:
    a first portion extending at least partially exteriorly of said fuel tank when said apparatus is installed on said fuel tank;
    a second portion being positioned at least partially extending into said fuel tank when said apparatus is installed on said fuel tank;
    a mount at least partially retained between said first portion and said second portion;
    said mount at least partially extending from between said first and second portions;
    said mount being sized and dimensioned for at least substantially corresponding to an opening in said fuel tank to which said apparatus is to be attached;
    said mount being attachable to said fuel tank;
    at least one protrusion extending through one of said first portion and second portion for retaining said mount relative to said apparatus.

7. A fuel system apparatus for installation on a fuel tank, said apparatus comprising:
    a first portion extending at least partially exteriorly of said fuel tank when said apparatus is installed on said fuel tank;
    a second portion being positioned at least partially extending into said fuel tank when sad apparatus is installed on said fuel tank;
    a mount at least partially retained between said first portion and on said second portion; said mount at least partially extending from between said first and second portions;

said mount being sized and dimensioned for at least substantially corresponding to an opening in said fuel tank to which said apparatus is to be attached;

said mount being attachable to said fuel tank;

a retainer on said apparatus extending over at least a portion of at least one of said first portion and said mount for retaining said mount on said apparatus.

8. The apparatus of claim 7, wherein said retainer extends over a corresponding portion of said first portion.

9. The apparatus of claim 7, wherein said retainer extends over a corresponding portion of said mount.

10. A fuel system apparatus for attachment to a fuel tank, said apparatus comprising:

a first portion;

a first flange extending from said first portion;

a second portion;

a second flange extending from said second portion;

a mount carried on said apparatus;

at least a portion of said mount being retained on said apparatus extending from between said first portion and said second portion; and said mount at least partially extending from said apparatus for attachment on said fuel tank.

11. The apparatus of claim 10, wherein mount is formed of a material compatible for welding to said tank.

12. The apparatus of claim 10, wherein said first portion is attached to said second portion.

13. The apparatus of claim 12, wherein said first portion is compatible for welding to said second portion.

14. The apparatus of claim 13, wherein said first portion and said second portion are incompatible for welding to said fuel tank, and said mount being weldable to said fuel tank.

15. The apparatus of claim 10, further comprising a seal positioned between said first portion and said second portion for sealing said apparatus.

16. A fuel system apparatus for attachment to a fuel tank, said apparatus comprising:

a first portion;

a second portion;

a mount carried on said apparatus;

said mount being retained on said apparatus proximate said first portion and said second portion;

said mount at least partially extending from said apparatus for installation on said fuel tank; and a retainer on said mount extending over at least a portion of said first portion for retaining said mount on said apparatus.

17. A fuel system apparatus for attachment to a fuel tank, said apparatus comprising:

a housing being formed of a material which is generally incompatible for welding to said fuel tank;

a first flange on a portion of said housing;

a second flange on a portion of said housing spaced from said first flange;

means for mounting said apparatus to said fuel tank;

said mounting means being mount carried on said apparatus between said first flange and said second flange.

18. The apparatus of claim 17, wherein said mounting means is formed of a material compatible for welding to said tank.

19. The apparatus of claim 18, said housing including a first portion and a second portion, at least a portion of said mounting means is retained between said first portion and said second portion.

20. The apparatus of claim 18, wherein at least a portion of said mounting means extends from said housing for attachment to said fuel tank.

* * * * *